(12) United States Patent
Li et al.

(10) Patent No.: US 10,449,489 B2
(45) Date of Patent: Oct. 22, 2019

(54) HIGH EFFICIENT DESULFURIZATION-REGENERATION SYSTEM USING A SUSPENSION BED

(71) Applicant: Beijing Huashi United Energy Technology and Development Co., Ltd., Beijing (CN)

(72) Inventors: Lin Li, Beijing (CN); Lixin Guo, Beijing (CN); Ke Lin, Beijing (CN); Gang Zhao, Beijing (CN); Jun Song, Beijing (CN)

(73) Assignee: BEIJING HUASHI UNITED ENERGY TECHNOLOGY AND DEVELOPMENT CO. LTD, Beijing (CN)

( * ) Notice: Subject to any disclaimer, the term of this patent is extended or adjusted under 35 U.S.C. 154(b) by 3 days.

(21) Appl. No.: 15/861,166

(22) Filed: Jan. 3, 2018

(65) Prior Publication Data
US 2018/0296975 A1   Oct. 18, 2018

(30) Foreign Application Priority Data
Apr. 12, 2017   (CN) .......................... 2017 1 0236778

(51) Int. Cl.
*B01D 53/52*   (2006.01)
*B01D 1/00*    (2006.01)
(Continued)

(52) U.S. Cl.
CPC ........... *B01D 53/52* (2013.01); *B01D 1/0064* (2013.01); *B01D 19/0015* (2013.01);
(Continued)

(58) Field of Classification Search
None
See application file for complete search history.

(56) References Cited

U.S. PATENT DOCUMENTS 6,596,253 B1 *   7/2003   Barrere-Tricca ........................... B01D 53/1425
                                                                    423/573.1
2011/0167713 A1   7/2011   Quignard et al.

FOREIGN PATENT DOCUMENTS

CN       1307926 A     8/2001
CN     201351763 Y    11/2009
(Continued)

OTHER PUBLICATIONS

Kantarci el at. Bubble Column Reactors. Process Biochemistry, vol. 40, Issue 7, 2005. pp. 2263-2283 (Year: 2005).*
(Continued)

*Primary Examiner* — Jelitza M Perez
(74) *Attorney, Agent, or Firm* — Reches Patents

(57) ABSTRACT

A high efficient desulfurization-regeneration system using a suspension bed, including a suspension bed reactor, a gas liquid separation tank, a flash evaporation tank and an oxidation regeneration tank that are connected in sequence, and a fixed bed reactor connected to the exhaust port of the gas liquid separation tank. The system reduces the sulfur content in a hydrogen sulfide containing gas from 2.4-140 g/Nm$^3$ to 50 ppm or less, and further reduces the sulfur content to less than 10 ppm in conjunction with a fixed bed. High efficient desulfurization is achieved by combining the crude desulfurization of the suspension bed with fine desulfurization of the fixed bed connected in series. The spent desulfurizer can be regenerated by reacting an oxygen-containing gas with the rich solution, and the barren solution obtained by the regeneration may be recycled for use as desulfurization slurry, without generating secondary pollution.

20 Claims, 1 Drawing Sheet

(51) Int. Cl.
*B01D 19/00* (2006.01)
*B01D 53/80* (2006.01)
*B01D 53/96* (2006.01)

(52) U.S. Cl.
CPC ......... *B01D 19/0036* (2013.01); *B01D 53/80* (2013.01); *B01D 53/96* (2013.01); *B01D 2202/00* (2013.01); *B01D 2251/51* (2013.01); *B01D 2251/602* (2013.01); *B01D 2251/604* (2013.01); *B01D 2257/304* (2013.01); *B01D 2257/702* (2013.01)

(56) References Cited

FOREIGN PATENT DOCUMENTS

| CN | 102127462 A | 7/2011 |
|---|---|---|
| CN | 102242871 A | 11/2011 |
| CN | 102310005 A | 1/2012 |
| CN | 204051658 U | 12/2014 |
| CN | 104388117 A | 3/2015 |
| CN | 104588079 A | 5/2015 |
| CN | 204752627 U | 11/2015 |

OTHER PUBLICATIONS

Optromix. Scroiler™ is the New Type of Wet Air Scrubber that Saves Water. pp. 1-16. www.scroiler.com (Year: 2016).*

* cited by examiner

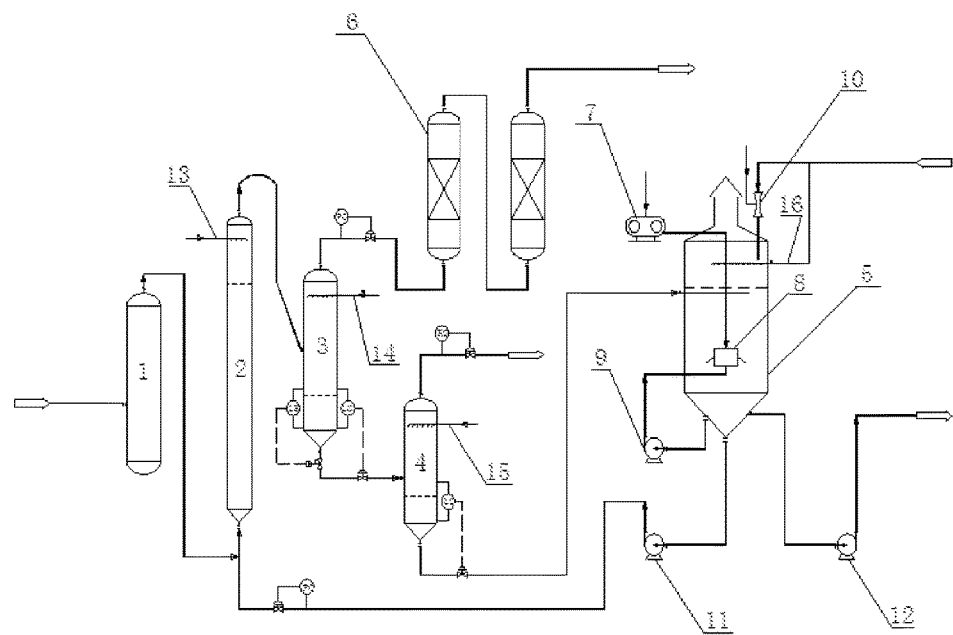

HIGH EFFICIENT DESULFURIZATION-REGENERATION SYSTEM USING A SUSPENSION BED

TECHNICAL FIELD

The present invention relates to the field of desulfurization technology, and more particularly to a high efficient desulfurization-rich solution regeneration system using a suspension bed reactor and a fixed bed reactor.

BACKGROUND

The removal of $H_2S$ is involved in many occasions such as the deep processing and comprehensive utilization of coal, the exploitation of oil and gas, petroleum refining and petrochemical production. Currently, the industrial desulfurization method is divided into two kinds: dry desulfurization process and wet desulfurization process.

Dry desulfurization process and the regeneration method thereof employs solid adsorbent to remove the hydrogen sulfide and organic sulfur in the gas, which is simple and reliable in operation and has a relatively high degree of desulfurization. Dry desulfurization process is suitable for the treatment of a gas having low sulfur content, and is often used for fine desulfurization. Iron oxide is a commonly used desulfurizer for dry desulfurization process, while other kinds of desulfurizers, such as activated carbon, molecular sieve, manganese oxide, zinc oxide, etc., are seldom used due to high cost.

Wet desulfurization process and the regeneration method thereof can be divided into physical absorption method, chemical absorption method and oxidation reduction method according to the solution absorption and regeneration method. Wet desulfurization process has large treatment capacity and continuous operation, suitable for the situation where three are large quantity of gas to be treated with high hydrogen sulfide content. The physical absorption method is mainly the low-temperature methanol method developed by the Linde Group and Lurgi Corporation in the early 1950s, and this method has high gas purification degree, can allow selective absorption of $CO_2$, $H_2S$ and separate removal and regeneration process thereof. However, the toxicity of methanol causes difficulties to the operation and maintenance. Chemical absorption methods mainly include monoethanolamine (MEA) method, N-methyldiethanolamine (MDEA) method and sulfone amine method, among which the monoethanolamine (MEA) method and MDEA desulfurization method are widely used in refinery gas and natural gas purification plant, and the sulfone amine method is mainly used for natural gas desulfurization industry, and is particularly effective for the removal of organic sulfides. Oxidation and reduction method is mainly used for the desulfurization of coke oven gas, and it mainly includes PDS method, tannin extract method, ADA method and modified ADA method. Oxidation and reduction method for desulfurization has low sour gas loading, large required solution circulation and high operation costs, and furthermore, the desulfurization waste liquid will produce secondary sewage and other problems.

In summary, among the existing desulfurization processes and regeneration methods, the amine method has annual desulfurization amount of more than 10,000 tons, and the dry desulfurization method has annual desulfurization amount of tens of tons to hundreds of tons commonly. For example, Chinese patent application document with a publication number of CN1307926A discloses a dry desulfurization process for flue gas using a circulating suspension bed and the regeneration method thereof, characterized by using a desulfurizer prepared by mixing dry lime, fly ash separated from a dust collector and water according to a certain proportion. The obtained desulfurizer has a certain activity and moisture content (8~15%). The flue gas is injected into an absorption tower of the circulating suspension bed from the bottom thereof via a low resistance flue gas jet mechanism, and meanwhile atomized cooling water and the desulfurizer are separately sprayed into the lower part and the bottom of absorption tower of the circulating suspension bed. Most of the desulfurizer is circulated in the tower with an internal separation unit provided at the upper portion of the absorption tower of the suspension bed, and unreacted desulfurizer bed material leaving with the flue gas is separated through a gas-solid separation device provided outside the suspension bed and is sent back to the bed, thereby ensuring the utilization of the calcium-based desulfurizer. This method has overcome the drawbacks that the mortar pipeline are prone to fouling and clogging and flow resistance of flue gas is high and thus the costs is high for the system operation and maintenance when the lime slurry is directly used as the desulfurizer.

However, the "suspension bed" used in the above technique is actually a "fluidized bed", wherein the solid desulfurizer is suspended in the flue gas flowing from bottom to up. It is well known that the distribution of solid particles in the bed is inhomogeneous in such a gas-solid fluidized bed, and the bed presents a two-phase structure, wherein one phase is a continuous phase with a relatively uniform distribution of particle concentration and porosity distribution close to the initial fluidized state, and the other phase is a discontinuous bubble phase that carries a small amount of particles moving upward through the bed. The excess amount of gas required for the initial fluidization gathers to form bubbles which moves upwards and gets ruptured on the bed surface to throw the particles to the space above the bed, which will result in large fluctuations of the bed interface and fluctuations of pressure drop. More unfavorably, the gas passing quickly through the bed in the form of bubbles has very little contact with the particles, while the gas in the continuous phase have a long contacting time with the particles due to the low velocity of gas, therefore resulting in nonuniform gas-solid contact, so the desulfurization efficiency of the above fluidized bed process can hardly meet the industrial requirements. Therefore, in view of small and medium-sized desulfurization projects, it is urgent to find a system for desulfurization and regeneration which have high desulfurization efficiency, simple operation, no secondary pollution, small occupation of land and low cost.

SUMMARY OF THE INVENTION

The present invention is designed to overcome the defects of low desulfurization efficiency, complicated process and equipment of the existing system for desulphurization and regeneration, and further to provide a high efficient desulfurization-regeneration system using a suspension bed with high desulfurization efficiency, simple process and low equipment investment and without secondary pollution.

For this purpose, the above-mentioned object of the present invention is achieved by the following technical solutions:

In one aspect, the present invention provides a high efficient desulfurization-regeneration system using a suspension bed, characterized by comprising:

a suspension bed reactor, provided with a feed inlet at bottom thereof and a discharge outlet at top thereof, the suspension bed reactor being filled with a mixture of a desulfurization slurry and a hydrogen sulfide containing gas, wherein the mixture has a dwell time of 5-60 mins in the suspension bed reactor;

a gas liquid separation tank, in connection with the discharge outlet of the suspension bed reactor, and provided with a rich solution outlet at bottom thereof and an exhaust port at top thereof;

a fixed bed reactor, in connection with the exhaust port of the gas liquid separation tank, and provided with a purified gas outlet at the top thereof;

a flash evaporation tank, in connection with the rich solution outlet of the gas liquid separation tank, and provided with a saturated liquid outlet at bottom thereof; and an oxidation regeneration tank, in connection with the saturated liquid outlet of the flash evaporation tank, and provided with a barren solution outlet arranged at bottom thereof and in connection with the feed inlet of the suspension bed reactor.

Preferably, the suspension bed reactor has an empty tower gas velocity of 0.03-0.3 m/s, preferably 0.05-0.2 m/s.

Preferably, the desulfurization slurry has a desulfurizer concentration of 1-5 wt %, preferably 2-3 wt %; and preferably, the desulfurizer is selected from a group consisting of amorphous iron oxide hydroxide, iron oxide, iron hydroxide or any mixture thereof, and the desulfurizer has a particle size of no greater than 20 μm.

Preferably, the suspension bed reactor has a first sprinkler means provided therein and disposed adjacent to the discharge outlet of the suspension bed reactor;

the gas liquid separation tank has a second sprinkler means provided therein and disposed adjacent to the exhaust port of the gas liquid separation tank;

the flash evaporation tank has a third sprinkler means provided therein and disposed adjacent to a light hydrocarbon discharge outlet at the top of the flash evaporation tank; and the oxidation regeneration tank has a fourth sprinkler means provided at an upper portion thereof.

Preferably, the system further comprises a solid liquid separator, in connection with the saturated liquid outlet arrange in a lower portion of the oxidation regeneration tank, and provide with a water outlet which is respectively connected with a water inlet of each of the first sprinkler, the third sprinkler and the fourth sprinkler.

Preferably, the oxidation regeneration tank is provided with an aeration device therein and a blower and aeration pump in exterior thereof, wherein the blower and the aeration pump are respectively connected with the aeration device, and the aeration pump is also connected with a liquid outlet in a lower portion of the oxidation regeneration tank.

Preferably, the system further comprises a venturi mixer having an outlet connected to a slurry inlet in an upper portion of the oxidative regeneration tank, and a water inlet connected to the water outlet of the solid liquid separator.

Preferably, the system further comprises a coalescer having an exhaust port communicating with the feed inlet of the suspension bed reactor.

Preferably, the flash evaporation tank has a pressure drop of 0.1-0.4 MPa.

Preferably, the suspension bed reactor comprises one suspension bed reactor, or at least two suspension bed reactors connected in series and/or in parallel.

The suspension bed reactor of the present invention adopts empty tube structure, full tank operation, without controlling the liquid level.

The technical solution of the present invention has the following advantages:

1. The high efficient desulfurization-regeneration system using a suspension bed provided by the present invention is adapted to carry out the following steps: mixing the desulfurization slurry with a hydrogen sulfide containing gas to obtain a first mixture, and passing the first mixture into a suspension bed reactor from bottom to top wherein the desulfurization slurry contacts and reacts sufficiently with the hydrogen sulfide containing gas during a dwell time of 5-60 minutes to produce a second mixture, i.e. a gas-solid-liquid three-phase mixture, in the suspension bed reactor; and subjecting the second mixture to gas liquid separation to produce a rich solution and a purified gas, feeding the purified gas into the fixed bed reactor for carrying out a second desulfurization to obtain a second purified gas, and subjecting the rich solution successively to flash evaporation tank for undergoing flash evaporation and oxidation regeneration tank for carrying out regeneration. The system is suitable for a wide range of raw materials and can treat hydrogen sulfide containing gas, such as biogas, coke oven gas, oilfield associated gas, natural gas and petrochemical gas, and may reduce the sulfur content in the hydrogen sulfide containing gas from 2.4-140 g/Nm$^3$ to 50 ppm or less, so that the desulfurization efficiency of the suspension bed is 98% or more. The sulfur content can be further reduced to less than 10 ppm in conjunction with a fixed bed. The invention achieves high efficient desulfurization by combining the crude desulfurization of the suspension bed with fine desulfurization of the fixed bed connected in series. The present invention may achieve regeneration of a spent desulfurizer by reacting an oxygen-containing gas with the rich solution, and the regeneration efficiency is as high as 65%-83%, and the barren solution may be recycled for being used as the desulfurization slurry, without generating secondary pollution. Therefore, the system of the present invention is simple and reasonable, with high desulfurization and regeneration efficiency, simple equipment, little occupation of land and low investment, which is very suitable for industrial promotion.

2. The high efficient desulfurization-regeneration system using a suspension bed provided by the present invention is provided with a coalescer in connection with the feed inlet of the suspension bed reactor for pretreating the hydrogen sulfide containing gas to remove heavy components above C5, in order to prevent occurrence of foaming. Foaming may be caused by introduction of heavy components above C5 into the subsequent system, thereby causing the increase of gas pressure drop at the time of regeneration, further affecting the regeneration effect.

3. The high efficient desulfurization-regeneration system provided by the present invention is provided with a flash evaporation tank disposed between the rich solution outlet of the gas liquid separation tank and the oxidation regeneration tank, for removing light hydrocarbons contained in the rich solution, thereby avoiding dangers of fire or explosion which may be caused due to introduction of the light hydrocarbons into the oxidation regeneration process.

4. The high efficient desulfurization-regeneration system provided by the present invention is provided with a venturi mixer for preparing desulfurization slurry, such that at least a part of the rich solution can be replaced with fresh desulfurization slurry when the rich solution reaches a sulfur capacity of 300% or more, thereby ensuring the desulfurization efficiency. The replaced part of the rich solution is fed into the solid liquid separator for carrying out solid-liquid separation to produce solid sulfur and a liquid phase, wherein the solid sulfur is mainly coarse sulfur, which can be sold as a product, thereby reducing the cost of desulfurization, and the liquid phase is returned to an oxidation regeneration tank for being used as a recycling supplementary moisture, which is conducive to improve the utilization of water resources.

BRIEF DESCRIPTION OF THE DRAWINGS

The above and other features of the present invention or the technical solutions in the prior art will now be described in detail with reference to certain example embodiments thereof illustrated in the accompanying drawings. It should be understood that the embodiments and drawings are given hereinbelow by way of illustration only, and thus are not limitative of the present invention, and apparent modifications can be made by those skilled in the art without paying any creative work, and wherein:

FIG. 1 is a flow chart of Embodiment 1 showing a high efficient desulfurization-regeneration system using a suspension bed, and wherein:

The reference numerals are as follows:

1—coalescer; 2—suspension bed reactor; 3—gas liquid separation tank; 4—flash evaporation tank; 5—oxidation regeneration tank; 6—fixed bed reactor; 7—blower; 8—aerator; 9—aeration pump; 10—venturi mixer; 11—barren solution pump; 12—saturated slurry pump; 13—first sprinkler means; 14—second sprinkler means; 15—third sprinkler means; 16—fourth sprinkler means.

DETAILED DESCRIPTION OF EMBODIMENTS

The technical solution of the present invention will now be described in detail with reference to the accompanying drawings. Obviously, the described embodiments are exemplary embodiments of the invention, rather than all embodiments. Based on embodiments in the present invention, all other embodiments obtained by those skilled in the art without making creative work are within the scope of the present invention.

In the description of the present invention, unless otherwise expressly stated and defined, the terms "upper", "lower", "inside", "outer" indicates that the azimuth or positional relationship is based on the azimuth or positional relationship shown in the accompanying drawings only for the purpose of facilitating and simplifying the description of the invention, rather than indicating or implying that the means or elements referred to must have a specific orientation in a particular orientation and be constructed and operated in a particular orientation, therefore cannot be construed to limit the scope of the present invention. The terms "connected" and "connected" should be broadly understood, for example, it may be a fixed connection, a detachable connection or an integral connection; it may be either directly connected or indirectly connected through an intermediate medium, or may be an internal communication between the two elements. It will be apparent to those skilled in the art that the specific meaning of the above terms in the present invention may be understood depending on the actual situation. The terms "first", "second", and "third" are provided for purposes of descriptions only and should not be construed to indicate or imply relative importance. In addition, the technical features described in different embodiments of the present invention described below may be recombined with each other as long as they do not form a conflict with each other.

In the following embodiments, the desulfurization efficiency of the suspension bed=(total mass of hydrogen sulfide in a feed gas−mass of hydrogen sulfide in the gas after the desulfurization with the suspension bed)/the total mass of the hydrogen sulfide in the feed gas; regeneration efficiency=mass of sulfur/(mass of the catalyst+mass of sulfur).

Embodiment 1

As shown in FIG. 1, the high efficient desulfurization-regeneration system using a suspension bed provided by the present embodiment comprises:

a suspension bed reactor 2, provided with a feed inlet at bottom thereof and a discharge outlet at top thereof, which has a first sprinkler means 13 provided therein and disposed adjacent to the discharge outlet of the suspension bed reactor 2, wherein the suspension bed reactor 2 has an empty tower gas velocity of 0.05-0.2 m/s; and wherein the suspension bed reactor 2 is full filled with a mixture of a hydrogen sulfide containing gas and a desulfurization slurry having a concentration of 2-3 wt %, and the mixture has a dwell time of 5-60 min in the suspension bed reactor 2; and alternatively, the desulfurization apparatus of the present embodiment is not limited to comprise one suspension bed reactor, it may also comprise two or more suspension bed reactors connected in series or in parallel;

a gas liquid separation tank 3, in connection with the discharge outlet of the suspension bed reactor 2, and provided with a rich solution outlet at bottom thereof and an exhaust port at top thereof; wherein the gas liquid separation tank 3 has a second sprinkler means 14 for spraying the desulfurization slurry, and the second sprinkler means 14 is provided inside the gas liquid separation tank 3 and disposed adjacent to the exhaust port of the gas liquid separation tank 3; and wherein the gas liquid separation tank 3 is provided with a low pressure condensate water return line and a low pressure steam return line on the outer side wall thereof; wherein alternatively, the desulfurization apparatus in this embodiment may comprise a plurality of gas liquid separation tanks according to the gas volume, the circulation amount of the slurry and the capacity of the equipment, etc., in order to prevent liquid from entering the fixed bed dry desulfurization unit and affecting the performance of the desulfurizer;

a fixed-bed reactor 6, connected to the exhaust port of the gas liquid separation tank 3, and provided with a purified gas outlet at the top thereof; wherein preferably, the present embodiment comprises two fixed bed reactors connected in series, to ensure smooth operation in case one of them encounters fluctuation and failure, or alternatively, comprises at least two fixed bed reactors connected in parallel;

a flash evaporation tank 4, having a pressure drop of 0.1-0.4 MPa, in connection with the rich solution outlet of the gas liquid separation tank 3, and provided with a saturated liquid outlet at bottom thereof; wherein the flash evaporation tank 4 has a third sprinkler means 15 provided therein and disposed adjacent to a light hydrocarbon discharge outlet at the top of the flash evaporation tank 4;

an oxidation regeneration tank 5, in connection with the saturated liquid outlet of the flash evaporation tank 4, and provided with a barren solution outlet arranged at bottom thereof and in connection with the feed inlet of the suspension bed reactor 2; wherein the oxidation regeneration tank 5 has a fourth sprinkler means 16 provided at an upper portion thereof; and wherein the oxidation regeneration tank 5 is provided with an aerator 8 therein and a blower 7 and a aeration pump 9 in exterior thereof, wherein the blower and the aeration pump are respectively connected with the aerator 8, and the aeration pump 9 is connected with a liquid outlet in a lower portion of the oxidation regeneration tank 5;

a venturi mixer 10, having an outlet connected to a slurry inlet in an upper portion of the oxidative regeneration tank 5, and further having a desulfurizer inlet and a water inlet; and a solid liquid separator (not shown in the drawings), in connection with a saturated liquid outlet arranged in a lower portion of the oxidation regeneration tank 5, and provided with a water outlet which is respectively connected with a water inlet of each of the first sprinkler, the third sprinkler, the fourth sprinkler and the venturi mixer 10.

As an alternative embodiment, the present embodiment further comprises a coalescer 1 having an exhaust port communicating with the feed inlet of the suspension bed reactor 2.

The above high efficient desulfurization-regeneration system using a suspension bed works as follows:

(1) mixing a feed gas having a $H_2S$ content of 2.4-140 $g/Nm^3$ with a desulfurization slurry composed of amorphous iron oxide hydroxide and water to obtain a mixture, and passing the mixture into a suspension bed reactor from bottom to top and controlling the mixture to have a dwell time of 5-60 minutes in the suspension bed reactor such that the desulfurization slurry contacts and reacts sufficiently with the feed gas;

(2) subjecting a gas-solid-liquid three-phase mixture discharged from the suspension bed reactor to gas liquid separation to produce a rich solution and a purified gas, wherein the purified gas was determined to have a $H_2S$ content reduced to less than 50 ppm, so that the desulfurization efficiency was as high as 98% or more;

(3) feeding the purified gas into a fixed bed reactor filled with magnetic iron oxide as desulfurizer for carrying out a second desulfurization, with keeping a gas flow rate of 1-20 m/s in the fixed bed reactor, to obtain a second purified gas which was determined to have a $H_2S$ content of less than 10 ppm;

(4) feeding the rich solution obtained in step (2) into a flash evaporation tank for undergoing flash evaporation to remove light hydrocarbon, and then feeding the rich solution into a regeneration tank, pressurizing the rich solution with an aeration pump, mixing it with air from the blower and delivering into an aerator for aerating and well mixing to form a gas-liquid mixture which was then sprayed evenly through jetting holes of the aerator, such that an intensive back mixing was achieved in the oxidation regeneration tank and reaction took place for 30-60 minutes, wherein the actual introduction amount of air in the reaction process is 5-15 times of a theoretical consumption amount thereof, to obtain a barren solution, wherein the regeneration efficiency is 65-83%; and the barren solution is then pressurized by a barren solution pump and recycled to the Step (1) for being used as the desulfurization slurry; wherein advantageously, the intensive back mixing in the oxidation regeneration tank can prevent the settlement of the desulfurizer, and can allow the resulting elemental sulfur bubbles to move upward and float on the top of the oxidation regeneration, so there is no need of additional separation;

Wherein, when the rich solution reaches a sulfur capacity of 300% or more, it is considered to be saturated and the rich solution needs to be replaced with fresh desulfurization slurry. In the present embodiment, half tank of the rich solution in the oxidation regeneration tank can be replaced by fresh desulfurization slurry prepared by the venturi mixer, then the replaced rich solution is subjected to solid-liquid separation to produce solid sulfur and a liquid phase, wherein the solid sulfur is delivered out and the liquid phase is returned to the oxidation regeneration tank for being used as a recycling supplementary moisture.

Alternatively, replacing the rich solution with the fresh desulfurization slurry may be carried out in many ways, depending on the desulfurization amount, site, and ease of handling, and generally, there are two manners: ① replacing half tank of the rich solution in the oxidation regeneration tank with fresh desulfurization slurry, in this way only one oxidation regeneration tank is required, so having the advantages of economic space occupation and low investment, but the replacement cycle is short; ② replacing all of the rich solution in the oxidation regeneration tank with fresh desulfurization slurry, in this way, two oxidation regeneration tanks are needed, having the disadvantages of large space occupation and high investment, but the replacement cycle is long.

The feed gas that can be processed with the integrated system of the present invention may be selected from a group consisting of biogas, coke oven gas, oilfield associated gas, natural gas, petrochemical gas or any mixture thereof. In case the feed gas is oilfield associated gas, natural gas or petrochemical gas, it is necessary to pretreat the feed gas in a coalescer to remove heavy components above C5 in prior to mixing it with the desulfurization slurry.

When the desulfurization-regeneration system according to the present invention is shut down, water is sprayed into the suspension bed reactor 2 through the first sprinkler means 13 to achieve the purpose of cleaning. In addition, in order prevent the sulfur from accumulating in the liquid surface, spraying the desulfurization slurry into the gas liquid separation tank 3 through the second sprinkler means 14, spraying water into the flash evaporation tank 4 through the third sprinkler means 15, and spraying water into the oxidation regeneration tank 5 through the fourth sprinkler means 16, all of which play a role of scouring.

It is obvious that the above embodiments are given by way of illustration only, and thus are not limitative of the present invention. Those skilled in the art should understand, any equivalent alternatives derived on the basis of the present invention should be embraced within the protection scope of the present invention.

The invention claimed is:

1. A high efficient desulfurization-regeneration system using a suspension bed, comprising:
   a suspension bed reactor, provided with a feed inlet at bottom thereof and a discharge outlet at top thereof, the suspension bed reactor being filled with a mixture of a desulfurization slurry and a hydrogen sulfide containing gas, wherein the mixture has a dwell time of 5-60 mins in the suspension bed reactor;
   a gas liquid separation tank, in connection with the discharge outlet of the suspension bed reactor, and provided with a rich solution outlet at bottom thereof and an exhaust port at top thereof;

a fixed bed reactor, in connection with the exhaust port of the gas liquid separation tank, and provided with a purified gas outlet at the top thereof;

a flash evaporation tank, in connection with the rich solution outlet of the gas liquid separation tank, and provided with a saturated liquid outlet at bottom thereof; and an oxidation regeneration tank, in connection with the saturated liquid outlet of the flash evaporation tank, and provided with a barren solution outlet arranged at bottom thereof and in connection with the feed inlet of the suspension bed reactor, wherein, the suspension bed reactor has a first sprinkler means provided therein and disposed adjacent to the discharge outlet of the suspension bed reactor;

the gas liquid separation tank has a second sprinkler means provided therein and disposed adjacent to the exhaust port of the gas liquid separation tank;

the flash evaporation tank has a third sprinkler means provided therein and disposed adjacent to a light hydrocarbon discharge outlet at the top of the flash evaporation tank; and the oxidation regeneration tank has a fourth sprinkler means provided at an upper portion thereof.

2. The high efficient desulfurization-regeneration system of claim 1, wherein the suspension bed reactor has an empty tower gas velocity of 0.03-0.3 m/s.

3. The high efficient desulfurization-regeneration system of claim 2, wherein the desulfurization slurry has a desulfurizer concentration of 1-5 wt %.

4. The high efficient desulfurization-regeneration system of claim 2, further comprising a solid liquid separator, in connection with a saturated liquid outlet arranged in a lower portion of the oxidation regeneration tank, and provided with a water outlet which is connected with a water inlet of each of the first sprinkler, the third sprinkler and the fourth sprinkler respectively.

5. The high efficient desulfurization-regeneration system of claim 4, further comprising a venturi mixer having an outlet connected to a slurry inlet arranged in an upper portion of the oxidative regeneration tank, and a water inlet connected to the water outlet of the solid liquid separator.

6. The high efficient desulfurization-regeneration system of claim 2, wherein the oxidation regeneration tank is provided with an aeration device therein and a blower and an aeration pump outside thereof, wherein the blower and the aeration pump are respectively connected with the aeration device, and the aeration pump is connected with a liquid outlet arranged in a lower portion of the oxidation regeneration tank.

7. The high efficient desulfurization-regeneration system of claim 2, further comprising a coalescer having an exhaust port communicating with the feed inlet of the suspension bed reactor.

8. The high efficient desulfurization-regeneration system of claim 2, wherein, the flash evaporation tank has a pressure drop of 0.1-0.4 MPa.

9. The high efficient desulfurization-regeneration system of claim 2, wherein the desulfurization-regeneration system further comprises one of the suspension bed reactor, or at least two of the suspension bed reactors connected in series and/or in parallel.

10. The high efficient desulfurization-regeneration system of claim 2, wherein the desulfurization slurry has a desulfurizer concentration of 2-3 wt %.

11. The high efficient desulfurization-regeneration system of claim 1, wherein the desulfurization slurry has a desulfurizer concentration of 1-5 wt %.

12. The high efficient desulfurization-regeneration system of claim 1, further comprising a solid liquid separator, in connection with a saturated liquid outlet arranged in a lower portion of the oxidation regeneration tank, and provided with a water outlet which is connected with a water inlet of each of the first sprinkler, the third sprinkler and the fourth sprinkler respectively.

13. The high efficient desulfurization-regeneration system of claim 12, further comprising a venturi mixer having an outlet connected to a slurry inlet arranged in an upper portion of the oxidative regeneration tank, and a water inlet connected to the water outlet of the solid liquid separator.

14. The high efficient desulfurization-regeneration system of claim 1, wherein the oxidation regeneration tank is provided with an aeration device therein and a blower and an aeration pump outside thereof, wherein the blower and the aeration pump are respectively connected with the aeration device, and the aeration pump is connected with a liquid outlet arranged in a lower portion of the oxidation regeneration tank.

15. The high efficient desulfurization-regeneration system of claim 1, wherein the flash evaporation tank has a pressure drop of 0.1-0.4 MPa.

16. The high efficient desulfurization-regeneration system of claim 1, wherein the desulfurization-regeneration system further comprises one of the suspension bed reactor, or at least two of the suspension bed reactors connected in series and/or in parallel.

17. The high efficient desulfurization-regeneration system of claim 1, wherein the suspension bed reactor has an empty tower gas velocity of 0.05-0.2 m/s.

18. The high efficient desulfurization-regeneration system of claim 1, wherein the desulfurization slurry has a desulfurizer concentration of 2-3 wt %.

19. A high efficient desulfurization-regeneration system using a suspension bed, comprising:

a suspension bed reactor, provided with a feed inlet at bottom thereof and a discharge outlet at top thereof, the suspension bed reactor being filled with a mixture of a desulfurization slurry and a hydrogen sulfide containing gas, wherein the mixture has a dwell time of 5-60 mins in the suspension bed reactor;

a gas liquid separation tank, in connection with the discharge outlet of the suspension bed reactor, and provided with a rich solution outlet at bottom thereof and an exhaust port at top thereof;

a fixed bed reactor, in connection with the exhaust port of the gas liquid separation tank, and provided with a purified gas outlet at the top thereof;

a flash evaporation tank, in connection with the rich solution outlet of the gas liquid separation tank, and provided with a saturated liquid outlet at bottom thereof;

an oxidation regeneration tank, in connection with the saturated liquid outlet of the flash evaporation tank, and provided with a barren solution outlet arranged at bottom thereof and in connection with the feed inlet of the suspension bed reactor; and a coalescer having an exhaust port communicating with the feed inlet of the suspension bed reactor.

20. A high efficient desulfurization-regeneration system using a suspension bed, comprising:
- a suspension bed reactor, provided with a feed inlet at bottom thereof and a discharge outlet at top thereof;
- a gas liquid separation tank, in connection with the discharge outlet of the suspension bed reactor, and provided with a rich solution outlet at bottom thereof and an exhaust port at top thereof;
- a fixed bed reactor, in connection with the exhaust port of the gas liquid separation tank, and provided with a purified gas outlet at the top thereof;
- a flash evaporation tank, in connection with the rich solution outlet of the gas liquid separation tank, and provided with a saturated liquid outlet at bottom thereof; and
- an oxidation regeneration tank, in connection with the saturated liquid outlet of the flash evaporation tank, and provided with a barren solution outlet arranged at bottom thereof and in connection with the feed inlet of the suspension bed reactor, wherein,
- the suspension bed reactor has a first sprinkler means provided therein and disposed adjacent to the discharge outlet of the suspension bed reactor;
- the gas liquid separation tank has a second sprinkler means provided therein and disposed adjacent to the exhaust port of the gas liquid separation tank;
- the flash evaporation tank has a third sprinkler means provided therein and disposed adjacent to a light hydrocarbon discharge outlet at the top of the flash evaporation tank; and
- the oxidation regeneration tank has a fourth sprinkler means provided at an upper portion thereof.

* * * * *